Nov. 8, 1966 J. ROSA 3,284,689
DYNAMO ELECTRIC MACHINE CONTROL APPARATUS EMPLOYING PULSES
Filed June 20, 1963 3 Sheets-Sheet 1

WITNESSES
Leon J. Taza
James F. Young

INVENTOR
John Rosa
BY
Clement J. Paznokas
ATTORNEY

DYNAMO ELECTRIC MACHINE CONTROL APPARATUS EMPLOYING PULSES

Filed June 20, 1963

DYNAMO ELECTRIC MACHINE CONTROL APPARATUS EMPLOYING PULSES

Filed June 20, 1963

United States Patent Office 3,284,689

Patented Nov. 8, 1966

3,284,689

DYNAMO-ELECTRIC MACHINE CONTROL APPARATUS EMPLOYING PULSES

John Rosa, Pittsburgh, Pa., assignor to Westinghouse Electric Corporation, Pittsburgh, Pa., a corporation of Pennsylvania Filed June 20, 1963, Ser. No. 289,319
9 Claims. (Cl. 318—341)

This invention relates to pulse producing apparatus and a control system incorporating such apparatus, and more particularly to a signal responsive generator of pulses suitable for firing controllable electronic valves, particularly of the semiconductor type such as silicon controlled rectifiers.

In many circuits employing a plurality of controlled rectifiers, the cathode circuits of the controlled rectifiers are not commonly connected, and isolated firing circuits are required for the respective controlled rectifiers. Also in many cases the firing circuits must be driven in response to the sum of a plurality of signals between which electric isolation may be desired.

In accordance with one embodiment of the invention, the above desired ends are attained in a plural signal responsive firing circuit for controlled electronic valve pulse producing circuit, wherein a magnetic amplifier which produces a train of output pulses with polarity dependent on net input polarity drives a one-shot pulse generator with a saturable magnetic output circuit that produces an output pulse on a plurality of isolated lines in response to each output pulse of only one polarity of the magnetic amplifier, and no output pulse in the absence of magnetic amplifier output pulses of said one polarity. Where it is desired to produce trains of pulses in response to magnetic amplifier input signals of both polarities, the output of the magnetic amplifier is coupled to two one-shot pulse generators each of which provides firing pulses to a different one of two controlled electronic valves in response to different polarity output pulses of the magnetic amplifier. A further aspect of the invention contemplates the use of the latter arrangement in a novel regulating system for an electrodynamic machine.

It is therefore an object of this invention to provide a novel pulse generator which is either ON or OFF in response respectively to two different net levels of input drive, for example, when the summation of a plurality of input signals is positive or negative.

Another object of the invention is to provide a novel pulse generator which responds to electrically isolated input signals to provide a train of output pulses on a plurality of isolated output lines in response to net input excitation of only a particular polarity.

It is therefore an object of the invention to provide a signal responsive pulse generating system which provides trains of pulses on either first or second output channels depending on whether the net input drive is positive or negative. Another object is to provide a signal responsive pulse generating system which provides trains of pulses on first or second output channels depending on which of two different net input drives is applied to the system.

Another object of the invention is to provide a novel pulse generator with a low impedance output.

Another object of the invention is to provide a novel signal responsive pulse generator having electrical isolation between input signals.

Another object is to provide a novel signal responsive pulse generator having high sensitivity to low level input signals.

Still another object is to provide a novel signal responsive pulse generator having high stability.

A further object of the invention is to provide a novel signal responsive pulse generator having fast response.

Another object is to provide a novel pulse generator having a plurality of electrically isolated output lines.

Another object is to provide a pulse generating system which will produce a train of pulses of only a particular polarity in response to input drive of given polarity, said pulses having a uniform magnitude independent of signal magnitude.

Another object of the invention is to provide a signal responsive pulse generator which provides on a plurality of isolated output lines a train of output pulses in response to an input signal of only a given polarity.

Another object is to provide a pulse generating system for controlling electronic valves in first and second current paths to pass current through either one or the other of said paths depending on which of two different net input drive conditions is imposed on the system.

Still another object is to provide a fast responding system for regulating a condition that is responsive to an electrodynamic machine.

Other objects and advantages of the present invention will become apparent from the following description taken in connection with the accompanying drawings illustrating a preferred embodiment of the invention.

Figure 1:
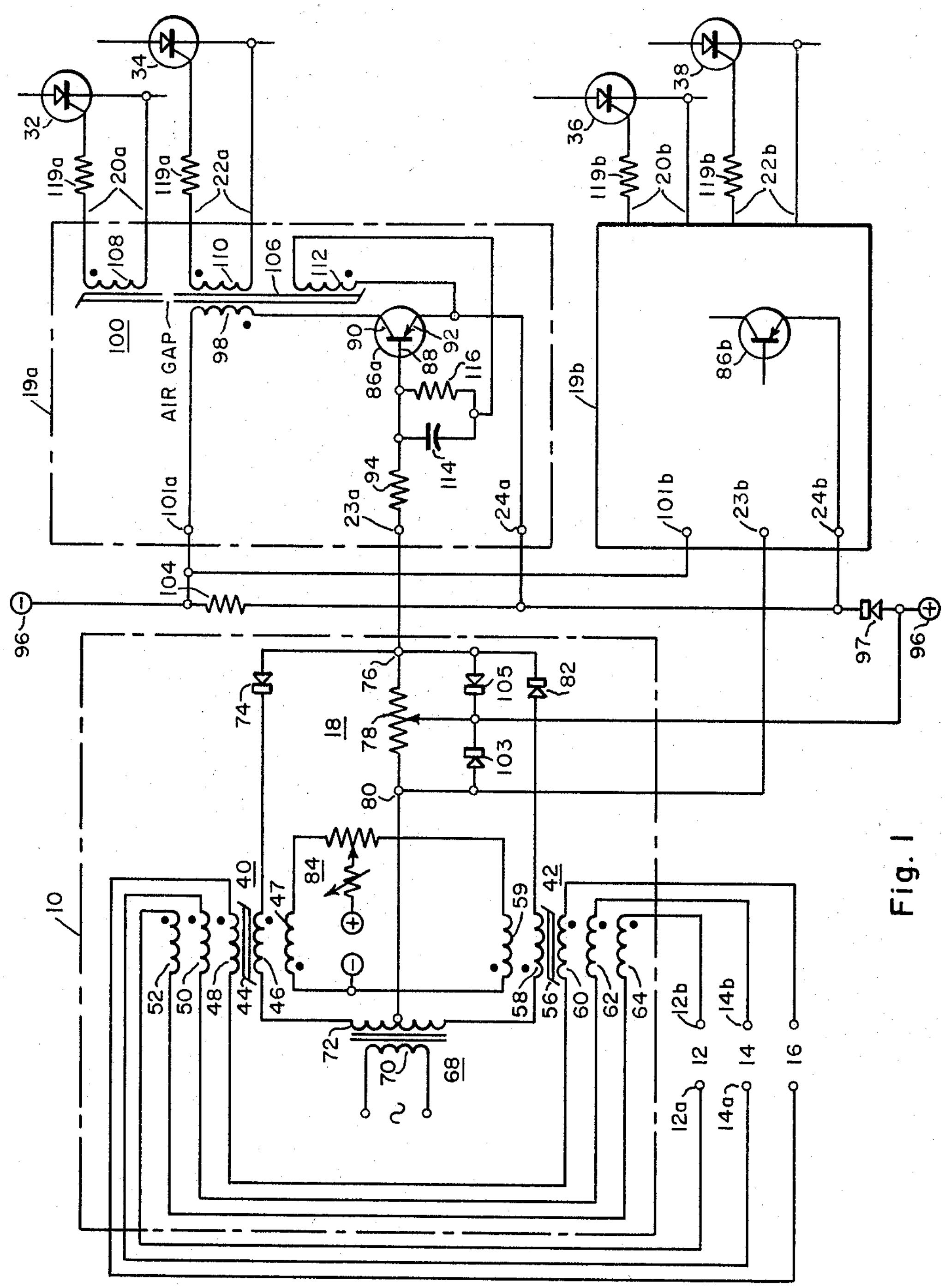
FIGURE 1 is a schematic diagram of a firing circuit for controlled rectifiers which circuit embodies the present invention.

Referring now to FIG. 1, there is shown a pulse generator 10 having a plurality of isolated inputs 12, 14 and 16, and an output circuit 18 which produces respective pulse trains of one or the opposite polarity in response respectively to one or the other of two different signal induced input conditions, for example net positive and net negative input drives.

The output 18 is coupled to drive second and third pulse generators **19*a* and 19*b*. Generator 19*a* provides on a plurality of isolated output lines 20*a* and 22*a* a train of output pulses in response to pulses of one polarity produced at the output 18 of generator 10. On the other hand, generator 19*b*, produces on a plurality of isolated output lines 20*b* and 22*b* a train of output pulses in response to output pulses of the opposite polarity produced at the output circuit 18 of generator 10. Thus when the output pulses at output circuit 18 of generator 10 are of one polarity, one of the generators 19*a* and 19*b* is ON while the other of the generators is OFF, and vice versa when the output polarity at the output 18 of the generator 10 is reversed. Generators 19*a* and 19*b* have corresponding input terminals 23*a*, 24*a* and 23*b* and 24*b*. Lines 20*a* and 22*a* are connected to simultaneously drive the respective gating circuits of a pair of controllable electronic valves 32 and 34, which may be controlled rectifiers as shown. In similar manner, output lines 20*b* and 22*b* are connected to simultaneously drive a pair of controlled rectifiers 36 and 38. Controlled rectifiers 32, 34, 36 and 38** may for example be those with the corresponding numbers in the reversing switch of the hereinafter described regulating circuit shown in FIG. 2.

By way of example, pulse generator 10 is shown as a saturable electromagnetic pulse generating means comprising two self-saturating amplifiers 40 and 42. Amplifier 40 includes a saturable magnetic core 44 having inductively disposed thereon a load or gating winding 46, a bias winding 47, and a plurality of control windings 48, 50, and 52. Amplifier 42 includes a saturable magnetic core 56 having inductively disposed thereon a gating or load winding 58, a bias winding 59, and a plurality of control windings 60, 62 and 64. In these magnetic amplifiers, winding relations are indicated by the polarity dot convention. That is current flowing into the polarity dot end of the winding will drive the associated core toward positive saturation. Current flowing out of the polarity dot end of the winding will drive the saturated core away from positive saturation.

Windings 48 and 60 are connected in series opposition in a control circuit for the pulse generator having input terminals **12*a* and 12*b*. Being in opposed relation, windings 48 and 60 have opposite magnetic effects on their respective cores in response to a given polarity signal in these windings. Windings 50 and 62 are connected in series opposition in a control circuit having input terminals 14*a* and 14*b*. The opposed connection of each of these series pairs of control windings is indicated by the polarity dots. In similar manner windings 52 and 64 are connected to the input circuit 16**.

A transformer 68 having a primary winding 70 and a center tap secondary winding 72 is connected to drive the gating circuits of the amplifiers 40 and 42. The primary winding 70 is driven by any suitable alternating current, such as sine wave, rectangular wave, etc. The load or gating circuit of amplifier 40 comprises the upper half of the secondary winding 72, the gate winding 46, a rectifier 74, a junction 76, a center tapped load resistor 78, and a junction 80 connected in series. The load or gating circuit of amplifier 42 includes the lower half of the secondary winding 72, the gating winding 58, a rectifier 82, the terminal 76, the load resistor 78, and the terminal 80 connected in series.

The biasing scheme shown for the amplifiers 40 and 42 comprises the bias windings 47 and 59 connected through a balancing resistor network to a bias source, indicated merely by positive and negative terminals. The bias arrangement applies a bias voltage of sufficient magnitude to cause a bias current to flow in the bias windings 47 and 59 which resets the flux level in the cores so that when no resultant control magnetomotive force is applied through the control windings, the amplifiers 40 and 42 will saturate or "fire" at 90° of the A.C. (alternating current) applied to the amplifier through the primary 70. On one half-cycle of the applied A.C. the rectifiers 74 and 82 block all current flow. On the opposite half-cycle these rectifiers allow current to flow. The latter half-cycle is the gating half cycle during which the respective amplifiers are fired.

The configuration in which amplifiers 40 and 42 are arranged form a push-pull amplifier. As hereinbefore stated, both amplifiers 40 and 42 have been biased to fire at 90° at quiescent input. That is, these amplifiers will fire at 90° of the gating half-cycle of the applied A.C., and the voltages thereafter produced will oppose each other at the terminals 76 and 80, and thus no output voltage from the generator 10 will appear across the output resistor 78. Any combination of control currents through the respective control windings that advances the firing of one amplifier (from the 90° base) will retard the firing angle of the other by the same angle, thus producing a pulsed output across resistor 78 having a polarity dependent upon which amplifier fires first. The duration of the pulse is the interval between the firings of the two amplifiers.

The resultant input drive from any combination of control currents applied to the respective windings that advances the firing of amplifier 40 and retards the firing of amplifier 42 may arbitrarily be referred to as a positive net input drive or signal. Likewise, the resultant input drive of any combination of control currents applied to the respective control windings that advances the firing of amplifier 42 while retarding the firing of amplifier 40 may be referred to as a negative net input drive signal.

The basic operation of the generator 10 may be more specifically explained by considering the input circuits 12 and 14 and the control windings associated therewith while ignoring the input circuit 16. For example, if control circuit 16 is left open, and control currents are applied to the control circuits **12*a*–12*b* and 14*a*–14*b* with the polarities of the respective signals being applied being positive at 14*b* and positive at 12*a*, both amplifiers will fire at 90° if the applied signals to the inputs 12 and 14 are equal in magnitude (assuming that all the control windings are of the same number of turns). However, if the signal which is positive at 12*a* is of greater magnitude than the signal which is positive at 14*b* then the resultant will be a net input positive drive because amplifier 40 will fire earlier than amplifier 42, thus producing a small output pulse across resistor 78 of a polarity making terminal 80 positive. On the other hand, if the signal which is positive at 14*b* is greater than the signal which is positive at 12*a* then amplifier 42 will fire first, thus reversing the polarity of the output pulse across resistor 78 and making terminal 80** negative.

From the above, it is seen that the pulse generator 10 produces a train of pulses of one polarity across resistor 78 in response to a net positive input drive and a train of pulses of opposite polarity in response to a net negative input drive. The example for pulse generator 10 described herein is described in greater detail in U.S. Patent No. 3,080,486.

Pulse generators **19*a* and 19*b* are similar and only generator 19*a* will be described in detail. Corresponding input and output terminals of generators 19*a* and 19*b* bear the same reference numerals modified, however, with the letter suffix identifying a particular terminal with its associated generator. To insure output pulses of adequate magnitude, generators 19*a* and 19*b* are monostable oscillators thus providing output pulses of uniform magnitude which is independent of input signal variation. By way of example the specific form of monostable shown for generators 19*a* and 19*b*** is a one-shot or single swing blocking oscillator.

As is seen in the drawings, generator **19*a* includes a valve for example, the transistor 86*a* having respective base, collector, and emitter electrodes 88, 90 and 92. The input circuit to transistor 86*a* includes a connection from input terminal 23*a* through a current limiting and isolating resistor 94 to the base 88, and a connection from the input terminal 24*a* to the emitter 92. The collector terminal 90 is connected to the negative terminal of a D.C. voltage source 96 whose positive terminal is connected through a non-linear diode 97 to the emitter 92. Collector 90 is connected to the negative terminal of D.C. voltage source 96 through the primary winding 98 of a saturating transformer 100 and a power input terminal 101, the positive terminal of the source 96 being connected to the emitter 92 through a non-linear diode 97 and input terminal 24*a*. Together with a resistor 104, diode 97 forms a non-linear voltage divider across the power supply 96 to provide a substantially constant bias to the base 88, normally biasing transistor 86*a* to non-conduction. Input terminal 23*a* is connected to the junction 76, while input terminal 24*a* is connected to the midpoint of resistor 78 through diode 97. Thus, the input circuit 23*a*–24*a* of the generator 19*a* is connected across the right-hand half of the resistor 78. In like manner the input circuit 23*b*–24*b* of the generator 19*b* is connected across the left-hand half of resistor 78. A pair of diodes 103 and 105 are connected across both halves of resistor 78**.

Transistor **86*a* being a p-n-p (by way of example) type, requires a negative base drive to turn it ON. The base 88 will be made negative whenever the input to the generator 10 is such as to produce an output pulse across resistor 78 making junction 76 negative with respect to junction 80, thus turning transistor 86*a* ON. Whenever transistor 86a is turned ON collector current supplied by the D.C. source 96 flows through primary 98 to energize the saturable transformer 100**.

Saturable transformer 100 includes a saturable magnetic core 106 on which are inductively disposed primary 98 and respective secondary windings 108, 110 and 112. The secondaries 108 and 110 are respectively connected to the output lines 20a and 22a, and constitute electrically isolated outputs of the generator 19a.

To provide positive feedback between the output and input of transistor 86a, the secondary 112 is connected across the base-emitter circuit of the transistor through parallel connected capacitor 114 and resistor 116. The capacitor 114 provides an initial short-circuit for abrupt feedback, and the reisstor 116 limits the feedback to reasonable values.

The dot convention is used to mark terminals of identical polarity of the magnetically coupled windings of transformer 100.

Generator 19a operates as follows. As hereinbefore stated, transistor 86a is normally (no output across resistor 78) biased OFF by means of diode 97 through resistors 78 and 94. The bias voltage is equal to the voltage drop across diode 97 which is used here as a non-linear voltage divider.

Assume now that the net input drive or control ampere-turns to the input of generator 10 is positive thereby producing a train of pulses across resistor 78 of the polarity making junction 76 negative with respect to junction 80. The resulting current pulse will flow from terminal 80 through diodes 103 and 97 through the emitter base junction of transistor 86a, and resistor 94 to junction 76, causing transistor 86a to conduct. The resulting current through winding 98 induces a voltage in windings 108, 110 and 112, and the resulting feedback from winding 112 drives the transistor into higher conduction preferably to saturation. Substantially the entire voltage between terminals 101 and 24a now appears across the primary 98, and is transmitted through secondary windings 108 and 110 and the lines 20a and 22a to the gates of controlled rectifiers 32 and 34. Current limiting resistors 117 and 119 are provided in these lines to protect the gate junction from excess drive current. The positive feedback keeps the transistor in high conduction until the transformer 100 saturates and substantially reduces the feedback from the collector to the base of the transistor. By then the input pulse from across resistor 78 is gone and the collector current of the transistor and the flux in the transformer core will decrease. During the transition the transistor stays in saturation or high conduction for a short while, typically 25 microseconds, after which it abruptly returns to a non-conducting state, allowing the flux in the core of transformer 100 to reset to about zero. The collapsing flux will cut the winding turns in the opposite direction, thus reversing the polarity of the secondary winding voltages. The reversal of voltage across winding 112 will completely cut off the conduction of transistor 86a. The transformer 100 is so designed and arranged that the flux in the core 106 will reset to a low initial level close to zero.

The above one-shot or monostable operation initiated by a low level, narrow voltage pulse across resistor 78, triggers a flux swing in core 106, starting from a value close to zero, up to positive saturation and back to its initial value, resulting in a positive voltage pulse across the secondary windings 108 and 110 which is adequate to fire the controlled rectifiers 32 and 34.

As long as the polarity of the net input drive or control ampere turns to the magnetic amplifiers of generator 10 remains unchanged the generator 10 will refire the transistor trigger in every gating half cycle of the amplifiers 40 and 42, and the pulse generator 19a will put out a train of firing pulses into the gates of controlled rectifiers 32 and 34 at the recurrence rate of the pulse output of generator 10. If the polarity of the net control ampere turns or input drive to the pulse generator 10 is reversed, the output pulses from generator 10 will be produced across resistor 78 with reversed polarity, thereby causing transistor 86b of generator 19b to conduct thus to produce firing pulses on lines 20b and 22b thereby rendering the controlled rectifiers 36 and 38 conductive.

The reset flux level of the core 106 should be low enough to permit an adequate flux swing to induce an output pulse in the secondary windings of the transformer of the desired height and width to fire the controlled rectifiers. A low reset level can be arranged in a number of known ways. A preferred way is to use square loop core material and reduce the slope of the hysteresis loop by means of a suitable air gap to provide a low reset level, for example as illustrated by the hysterses curve shown in FIG. 2. Another way is to use square loop core material and employ a bias winding on the transformer supplied with sufficient bias current to reset the core at a suitably low level, for example as illustrated by the hysteresis loop shown in FIG. 3.

Figure 2:
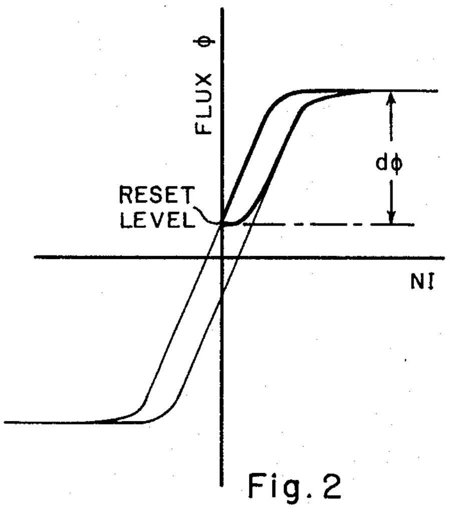
FIGS. 2 and 3 are graphs illustrating hysteresis loops of core arrangements which may be used in the invention.
Figure 3:
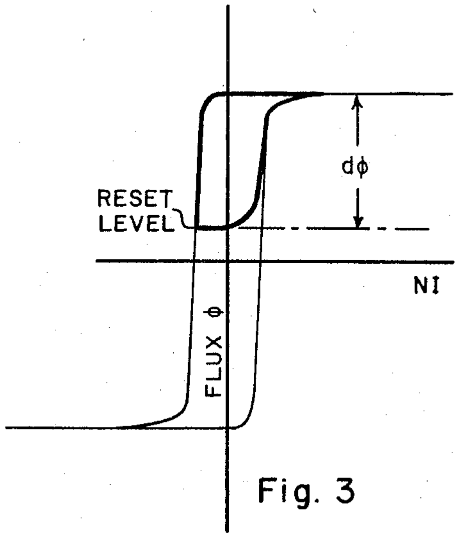

In FIGS. 2 and 3, $d\phi$ defines the flux swing of the core from the reset level to saturation during the one-shot cycle of generator 19a in response to one output pulse of the proper polarity from generator 10. The one-shot time cycle of the pulse of the pulse generator 19a should be short enough to allow formation of the output pulse and recovery to reset between input pulses to the generator 19a. Stated in another way, the output pulses from generator 10 should be sufficiently spaced to allow for the generation of a pulse by generator 19a and recovery to reset before the next output pulse from generator 10.

Figure 4:
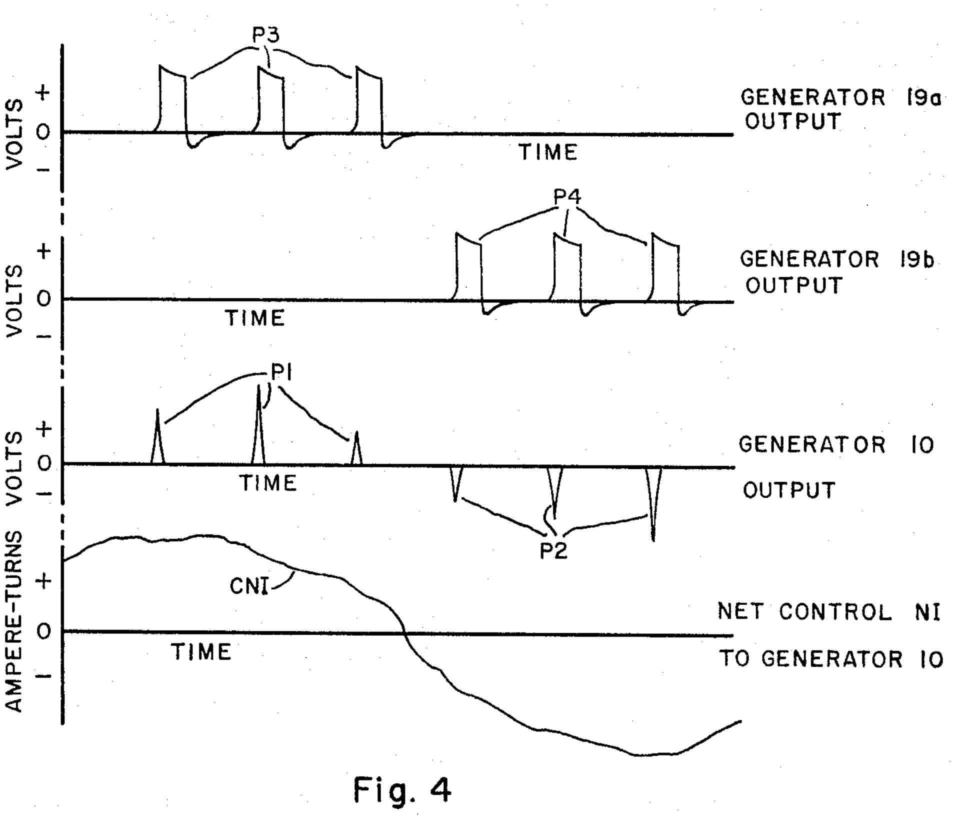
FIG. 4 is a graph showing waveforms responsive to particular input conditions.

In FIG. 4 the outputs of the pulse generators 19a and 19b resulting from particular polarities of input to generator 10 are plotted along the same scale of time base. The control ampere-turns (NI) input to generator 10 is represented by the curve CNI. As seen in this figure, the generator 10 puts out a train of pulses P1, of one polarity across output resistor 78 in response to net control ampere-turn or input drive of one polarity to generator 10, and a train of opposite polarity pulses P2 in response to net input drive of opposite polarity. In the one case pulse generator 19a is ON to produce a train of pulses P3, while the generator 19b is OFF. With a reversal of input to generator 10, generator 19b is turned ON to produce a train of pulses P4 while generator 19a is turned OFF.

Figure 5:
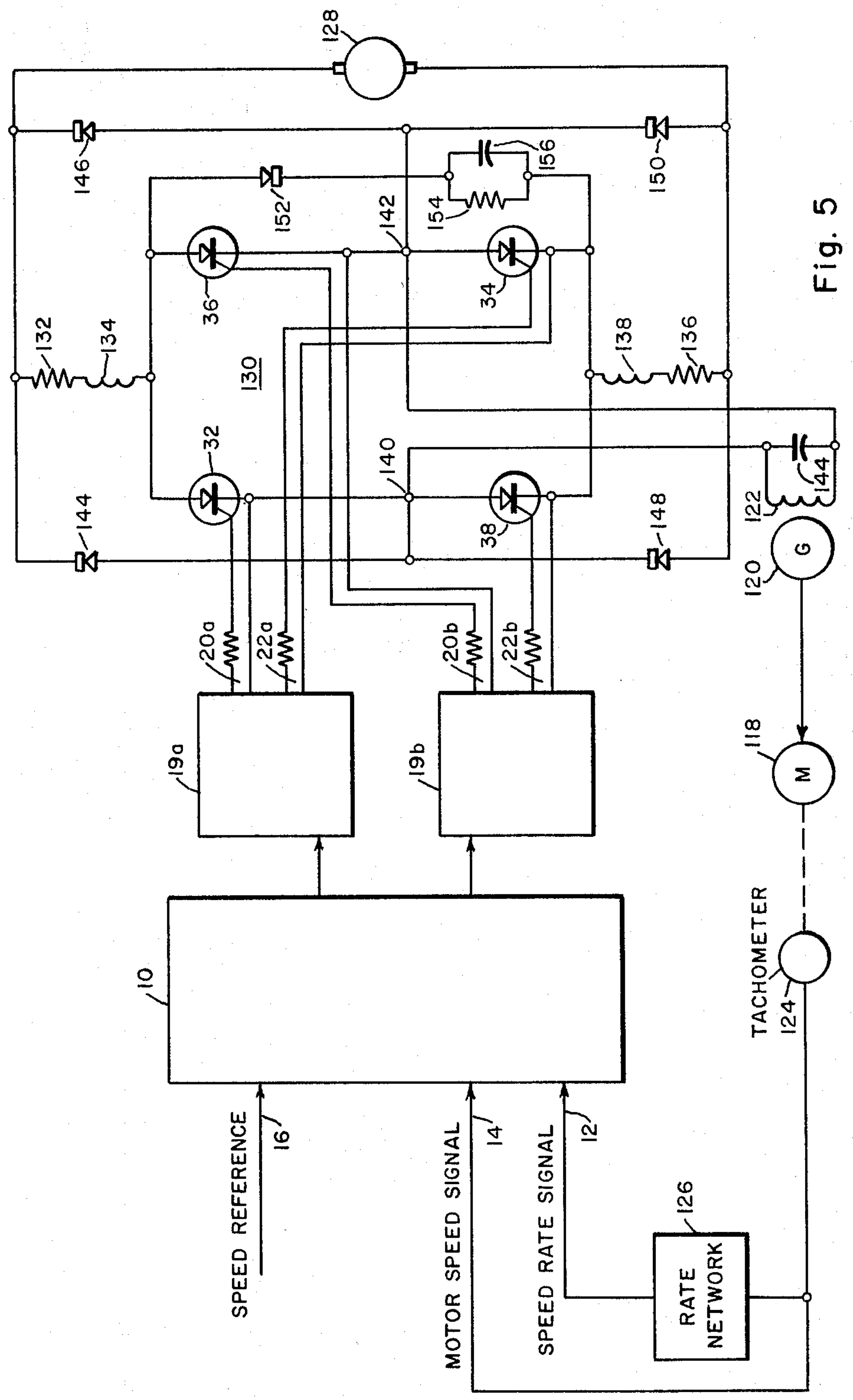
FIG. 5 is a schematic diagram of a speed regulating circuit embodying the invention.

An example of the application of the signal responsive pulse generating circuits of the present invention is shown in FIG. 5 wherein the heretofore described firing circuit forms a part of a novel control system for regulating a condition which is responsive to an electrodynamic machine, for example, the voltage of a generator, or the speed of a motor driven by a generator. The specific system described in FIG. 5 is a speed regulating system for a Ward-Leonard drive wherein the field of the generator driving the motor is controlled in response to the speed of the motor.

As seen in FIG. 5, the system includes the pulse generators 10, 19a and 19b selectively driving either controlled rectifiers 32 and 34 or controlled rectifiers 36 and 38 depending on the direction of deviation from the speed reference. The system in FIG. 5 further includes a Ward-Leonard drive including a motor 118 whose armature circuit is supplied by a generator 120 having an associated field winding 122. The output of a tachometer 124 driven by the motor 118 provides a speed signal to one of the input circuits of the pulse generator 10, for example input circuit 14, the tachometer also providing through a rate network 126, a speed rate signal through another input circuit of the pulse generator 10, for example input circuit 12. A speed reference signal from a suitable source is applied to yet another input circuit of the pulse generator 10, for example input circuit 16.

The generator field is supplied with power from a D.C. source 128 which is connectable to the generator field 122 in one or the other polarity through a double pole double throw reversing switch 130 formed by controlled rectifiers 32, 34, 36 and 38. With this arrangement the full magnitude of the source 128 is applied in one or the other direction to the field winding, resulting in regulation by field forcing.

The positive terminal of source 128 is connected through a resistor and a choke coil 132 and 134 to the anodes of controlled rectifiers 32 and 36, while the negative terminal of the source 128 is connected through a resistor 136 and a reactor 138 to the cathodes of controlled rectifiers 34 and 38. The cathode of rectifier 32 and the anode of rectifier 38 are connected to a junction 140 connected to one end of the generator field 122. In the same manner the cathode of rectifier 36 and the anode of rectifier 34 are connected to a junction 142 connected to the other end of the generator field 122. A capacitor 144 is connected across the generator field.

When the output pulse train of generator 10 is of such polarity to drive the pulse generator 19*a*, the pulse generator 19*b* is OFF. Under these conditions controlled rectifiers 36 and 38 block current flow while controlled rectifiers 32 and 34 are rendered conductive by the firing pulses from pulse generator 19*a*. As a result current flows through the generator field from the junction 140 toward the junction 142. On the other hand, when the output of pulse generator 10 is of such polarity as to drive pulse generator 19*b*, then pulse generator 19*a* is OFF. Under these conditions controlled rectifiers 32 and 34 block current while controlled rectifiers 36 and 38 are in conduction allowing current flow through the generator field from the junction 142 toward the junction 140.

When the voltage applied across the field winding 122 reverses and opposes the instantaneous current flow due to the field inductance, diodes 144, 146, 148 and 150 allow free discharge of the field current into the power supply. The rate of rise of voltage across the controlled rectifiers when the regulator is energized is limited by the network including a diode 152, a resistor 154 and a capacitor 156.

The speed reference signal is of a polarity to provide a positive input or ampere-turns component to the pulse generator 10 tending to drive pulse generator 19*a* thereby to apply field current to the generator field 122 in a direction to increase the output voltage of generator 120. On the other hand, the speed and speed rate signals derived from the tachometer 124 and applied to the inputs 12 and 14 of generator 10 are opposed to the speed reference signal and tend to drive pulse generator 19*b* which would produce current flow in the generator field in a direction tending to reduce the output of the generator 120. Thus the system provides corrective action in one or the other direction depending on the deviation of motor speed from a desired norm or reference represented by the speed reference signal.

If the speed reference signal is greater than the speed signals from the tachometer 124, pulse generator 19*b* will be energized to switch full power to the generator field 122 in a direction tending to drive the generator output upward. On the other hand, if the speed signals from the tachometer 124 are greater than the speed reference signal, then pulse generator 19*b* will be energized to switch the full field power to the generator field 122 in a direction tending to reduce the output voltage of generator 120 thereby to reduce the speed of motor 118.

From the description herein it is readily seen that the invention provides an apparatus, which, in response to a net input drive provided by a plurality of isolated input signals, produces pulse trains of one or the opposite polarity on a plurality of isolated output lines depending on the net input polarity. A further extension of the invention is disclosed in the novel regulating circuit described herein, wherein the excitation to an electrodynamic machine is applied in one or the other polarity through a reversing switch driven by the pulse generating apparatus of the invention in response to deviations in one or the other direction from a condition responsive to the electrodynamic machine.

It is to be understood that the herein described arrangements are simply illustrative of the principles of the invention, and that other embodiments and applications are within the spirit and scope of the invention.

I claim as my invention:

1. In a system for controlling an electrodynamic machine to regulate a condition which is responsive to said machine, a source of power for energizing said machine, first pulse generating means which produces respective pulse trains of one or the opposite polarity in response to and depending on the direction of deviation of said condition from a predetermined norm, second pulse generating means for generating a train of control pulses in response to said pulse train of one polarity, third pulse generating means for generating a train of control pulses in response to said pulse train of opposite polarity, each of said second and third pulse generating means having an input circuit coupled to said first pulse generating means and an output circuit controlled by the latter input circuit, reversible switch means having first and second modes of operation which respectively connect said power source in one and the opposite polarity to said machine in response respectively to deviation of said condition in one and the opposite direction, said switch means comprising first and second controllable electronic valves for operating the switch means respectively in its first and second modes, means connecting the output circuit of said second pulse generating means to said first valve for controlling the latter, and means for connecting the output circuit of said third pulse generating means to said second valve for controlling the latter.

2. In a system for controlling an electrodynamic machine to regulate a condition which is responsive to said machine, a source of power for energizing said machine, first pulse generating means which produces respective pulse trains of one or the opposite polarity in response to and depending on the direction of deviation of said condition from a predetermined norm, second pulse generating means for generating a train of control pulses in response to said pulse train of one polarity, third pulse generating means for generating a train of control pulse in response to said pulse train of opposite polarity, each of said second and third pulse generating means having an input circuit coupled to said first pulse generating means and an output circuit controlled by the latter input circuit, said output circuit having a plurality of isolated output lines, reversible switch means having first and second modes of operation which respectively connect said power sources in one and the opposite polarity to said machine in response respectively to deviation of said condition in one and the opposite direction from said norm, said switch means comprising first and second pluralities of controllable electronic valves for operating the switch means respectively in its first and second modes, said first plurality of valves being operative to supply power to said machine only in the sense tending to force said condition in a particular direction, said second plurality of valves being operative to supply power to said machine only in the sense tending to force said condition in the direction opposite to said particular direction, means connecting the respective isolated output lines of said second pulse generating means to respective ones of said first plurality of valves for controlling the latter, and means for connecting the respective isolated output lines of said third pulse generating means to respective ones of said second plurality of valves for controlling the latter.

3. In a system for controlling an electrodynamic machine to regulate a condition which is responsive to said machine, a source of power for energizing said machine, first pulse generating means which produces respective pulse trains of one or the opposite polarity in response to deviations of said condition in one or the opposite direction respectively from a predetermined norm, the polarity of said pulse trains being dependent on the direction of said deviation, second pulse generating means for generating a train of control pulses in response to said pulse of one polarity, third pulse generating means for generating a train of control pulses in response to said pulse train of opposite polarity, each of said second and third pulses generating means having an input circuit coupled to said first pulse generating means and an output circuit controlled by the latter input circuit, said output circuit including saturable electromagnetic means and a plurality of isolated output lines inductively coupled to said electromagnetic means, said input circuit being coupled to said electromagnetic means to obtain positive feedback, reversible switch means having first and second modes of operation which respectively connect said power source in one and the opposite polarity to said machine in response respectively to deviation of said condition in one and the opposite direction, said switch means comprising first and second pluralities of controllable electronic valves for operating the switch means respectively in its first and second modes, means connecting the respective isolated output lines of said second pulse generating means to respective ones of said first plurality of valves for controlling the latter, and means for connecting the respective isolated output lines of said third pulse generating means to respective ones of said second plurality of valves for controlling the latter.

4. The combination comprising pulse generating means that has input means and produces a pulse train of given polarity in response to a first net input drive condition imposed on said input means and a pulse train of opposite polarity in response to a second different net input drive condition imposed on said input means, first oscillator means for generating a train of first control pulses in response to said pulse train of given polarity, second oscillator means for generating a train of second control pulses in response to said pulse train of opposite polarity, a first load current path including a first controllable electronic valve which when conductive passes current through said first path, a second load current path including a second controllable electronic valve which when conductive passes current through said second path, means for rendering said first valve conductive in response to said first control pulses, and means for rendering said second valve conductive in response to said second control pulses.

5. The combination of claim 4 wherein each of said oscillator means is a monostable oscillator.

6. In a system for supplying a load with reversible power from a direct current power source, pulse generating means which has input means and produces a pulse train in response to either of two different net input drives applied to said input means, said pulse train being of one polarity in response to one of said net input drives and of the opposite polarity in response to the other of said net input drives, first oscillator means for producing a first series of pulses in response to said pulse train when of one polarity, second oscillator means for producing a second series of pulses in response to said pulse train when of the opposite polarity, a first controllable electronic valve for connecting said power source in one polarity to said load, a second controllable electronic valve for connecting said power source in the opposite polarity to said load, means connecting said first oscillator means to said first valve for rendering the first valve conductive in response to said first series of pulses, and means connecting said second oscillator means to said second valve for rendering the second valve conductive in response to said second series of pulses.

7. The combination of claim 6 wherein each of said oscillator means is a monostable oscillator.

8. The combination as in claim 6 wherein each of said valves is a semiconductor controlled rectifier.

9. The combination as in claim 1 wherein each of said valves is a semiconductor controlled rectifier.

References Cited by the Examiner

UNITED STATES PATENTS

| | | | |
|---|---|---|---|
| 2,886,763 | 5/1959 | Zelina | 322—36 X |
| 3,075,136 | 1/1963 | Jones | 307—88.5 |
| 3,080,486 | 3/1963 | Roberts et al. | 307—88 |
| 3,095,513 | 6/1963 | Lezan | 307—88.5 |
| 3,132,265 | 5/1964 | Welken et al. | 307—88.5 |
| 3,155,891 | 11/1964 | Rosa | 318—143 |
| 3,159,777 | 12/1964 | Manteuffel | 318—138 |
| 3,189,809 | 6/1965 | Sueker | 318—145 |

References Cited by the Applicant

UNITED STATES PATENTS 3,172,029 3/1965 Davis.

ORIS L. RADER, *Primary Examiner.*

S. GORDON, T. LYNCH, *Assistant Examiner.*